United States Patent
Kim et al.

(10) Patent No.: US 7,729,595 B2
(45) Date of Patent: *Jun. 1, 2010

(54) RECORDING MEDIUM HAVING A DATA STRUCTURE FOR MANAGING REPRODUCTION OF TEXT SUBTITLE DATA RECORDED THEREON AND RECORDING AND REPRODUCING METHODS AND APPARATUSES

(75) Inventors: Hyung Sun Kim, Seoul (KR); Kang Soo Seo, Kyunggi-do (KR); Byung Jin Kim, Kyunggi-do (KR)

(73) Assignee: LG Electronics Inc., Seoul (KR)

( * ) Notice: Subject to any disclaimer, the term of this patent is extended or adjusted under 35 U.S.C. 154(b) by 919 days.

This patent is subject to a terminal disclaimer.

(21) Appl. No.: 10/898,206

(22) Filed: Jul. 26, 2004

(65) Prior Publication Data

US 2005/0019018 A1    Jan. 27, 2005

(30) Foreign Application Priority Data

Jul. 25, 2003    (KR) .................. 10-2003-0051252

(51) Int. Cl.
*H04N 5/00* (2006.01)
*H04N 5/93* (2006.01)
*H04N 5/91* (2006.01)
*G11B 27/00* (2006.01)

(52) U.S. Cl. .................. 386/125; 386/52; 386/55; 386/82; 386/95; 386/126

(58) Field of Classification Search ......... 386/125–126, 386/52, 55, 82, 95
See application file for complete search history.

(56) References Cited

U.S. PATENT DOCUMENTS

| | | | |
|---|---|---|---|
| 4,040,088 | A | 8/1977 | Hannan |
| 5,519,443 | A | 5/1996 | Salomon et al. |
| 5,949,752 | A | 9/1999 | Glynn et al. |
| 5,999,225 | A | 12/1999 | Yagasaki et al. |
| 6,115,077 | A | 9/2000 | Tsukagoshi |
| 6,204,883 | B1 | 3/2001 | Tsukagoshi |

(Continued)

FOREIGN PATENT DOCUMENTS

CN    1385857    12/2002

(Continued)

OTHER PUBLICATIONS

ETSI EN 300 743, Digital Video Broadcasting(DVB); Subtitling System V1.2.1 (Oct. 2002).*

(Continued)

*Primary Examiner*—Thai Tran
*Assistant Examiner*—Daquan Zhao
(74) *Attorney, Agent, or Firm*—Harness, Dickey & Pierce, P.L.C.

(57) ABSTRACT

In the data structure for managing reproduction of text subtitle data, a text subtitle information area stores at least one text subtitle information segment. The text subtitle information segment is represented by a single PES packet of transport packets. In one embodiment, the text subtitle information segment includes an identifier identifying the text subtitle information segment as a text subtitle information segment and includes style information for text subtitle data.

17 Claims, 9 Drawing Sheets

U.S. PATENT DOCUMENTS

| | | | |
|---|---|---|---|
| 6,219,043 B1 | 4/2001 | Yogeshwar et al. | |
| 6,253,221 B1 | 6/2001 | Kim | |
| 6,275,457 B1 | 8/2001 | Maeda | |
| 6,288,990 B1 | 9/2001 | Fujiie et al. | |
| 6,381,513 B1 | 4/2002 | Takase et al. | |
| 6,452,609 B1* | 9/2002 | Katinsky et al. | 715/716 |
| 6,477,185 B1* | 11/2002 | Komi et al. | 370/536 |
| 6,763,178 B1 | 7/2004 | Suzuki et al. | |
| 7,197,234 B1 | 3/2007 | Chatterton | |
| 7,324,119 B1* | 1/2008 | Puri et al. | 345/602 |
| 2001/0030710 A1 | 10/2001 | Werner | |
| 2002/0006271 A1 | 1/2002 | Winter et al. | |
| 2002/0106193 A1 | 8/2002 | Park et al. | |
| 2002/0191218 A1 | 12/2002 | Kato | |
| 2002/0194618 A1 | 12/2002 | Okada et al. | |
| 2003/0021586 A1 | 1/2003 | Suh | |
| 2003/0156504 A1 | 8/2003 | Kanegae et al. | |
| 2003/0202431 A1 | 10/2003 | Kim et al. | |
| 2003/0235406 A1 | 12/2003 | Seo et al. | |
| 2004/0001699 A1 | 1/2004 | Seo et al. | |
| 2004/0081434 A1* | 4/2004 | Jung et al. | 386/95 |
| 2004/0101285 A1 | 5/2004 | Seo et al. | |
| 2005/0008339 A1 | 1/2005 | Kuroiwa et al. | |
| 2005/0201718 A1 | 9/2005 | Kato | |
| 2006/0153532 A1* | 7/2006 | McCrossan et al. | 386/95 |
| 2006/0288302 A1 | 12/2006 | Yahata et al. | |
| 2008/0253734 A1 | 10/2008 | Kang et al. | |

FOREIGN PATENT DOCUMENTS

| | | |
|---|---|---|
| CN | 1428770 | 7/2003 |
| EP | 0 737 009 | 10/1996 |
| EP | 0 737 979 | 10/1996 |
| EP | 0 791 925 | 8/1997 |
| EP | 0 942 609 | 9/1999 |
| EP | 1198132 | 4/2002 |
| EP | 1 204 280 | 5/2002 |
| EP | 1 280 347 | 1/2003 |
| EP | 1 408 505 | 4/2004 |
| EP | 1553769 | 7/2005 |
| EP | 1 614 108 | 1/2006 |
| EP | 1 643 765 | 4/2006 |
| GB | 1 556 366 | 11/1979 |
| GB | 1 586 431 | 3/1981 |
| JP | 60-179261 | 9/1985 |
| JP | 08-273304 | 10/1996 |
| JP | 09-035458 | 2/1997 |
| JP | 11-176137 | 7/1999 |
| JP | 2001-135066 | 5/2001 |
| JP | 2002-025197 | 1/2002 |
| JP | 2002-158971 | 5/2002 |
| JP | 2002-247526 | 8/2002 |
| JP | 2003-249057 | 9/2003 |
| RU | 2196389 | 1/2003 |
| RU | 2229174 | 5/2004 |
| WO | WO 99/22516 | 5/1999 |
| WO | WO 02-075739 | 9/2002 |
| WO | WO 03/056560 | 7/2003 |
| WO | WO 2004-030356 | 4/2004 |
| WO | WO 2004/034398 | 4/2004 |
| WO | WO 2004/036574 | 4/2004 |
| WO | WO 2004/066281 | 6/2004 |
| WO | WO 2004/056105 | 7/2004 |
| WO | WO 2004/090885 | 10/2004 |
| WO | WO 2004/093064 | 10/2004 |
| WO | WO 2004/098186 | 11/2004 |
| WO | WO 2005/074394 | 8/2005 |
| WO | WO 2005/074399 | 8/2005 |

OTHER PUBLICATIONS

"Digital Video Broadcasting (DVB)" ETSI Standards, European Telecommunications Standards Institute, Sophia-Antipo, FR, vol. BC, No. V121, Jun. 2002, XP014001876.
"WC3 Synchronized Multimedia Integration Language (SMIL) 1.0 specification," Jun. 15, 1998.
International Search Report dated Nov. 6, 2004.
European Search Report dated Jul. 24, 2007.
Blu-ray Disc—white paper blu-ray disc format—Mar. 2005.
European Search Report for counterpart European application, dated Jan. 31, 2005.
Office Action dated Oct. 30, 2008 by the Russian Patent Office for a counterpart Russian application.
Office Action by Russian Patent Office dated Feb. 18, 2009 for counterpart Russian application.
Notice of Allowance by Russian Patent Office dated May 28, 2009 for counterpart Russian Application No. 2006-116489.
Notice of Allowance by Russian Patent Office dated May 18, 2009 for counterpart Russian Application No. 2006-116506.
Notice of Allowance by European Patent Office dated Jun. 3, 2009 for counterpart European Application No. 05 721 896.8.
Article: Information Technology—Generic coding of moving pictures and associated audio information: Systems—published ISO-IEC/13818-1, Dec. 1, 2000.
Office Action by Japanese Patent Office dated Sep. 15, 2009 for counterpart Japanese Application No. 2006-535261.
Office Action by Japanese Patent Office dated May 8, 2009 for counterpart Japanese Application No. 2006-535261.
"WC3 Synchronized Multimedia Integration Language (SMIL) 1.0 Specification," Internet Citation, Jun. 15, 1998, XP002957990, retrieved on Oct. 28, 2002, pp. 11, 16-18, 20 and 22-25.
Blu-Ray Disc Founders, "White Paper Blu-Ray Disc Format: 2.B Audio Visual Application Format Specifications for BD-ROM," Internet Citation, Aug. 2004, XP002315435, Retrieved from the Internet: URL:http://www.blu-raydisc.com/assets/downloadablefile/2b_bdrom_audiovisualapplication-12841.pdf, Retrieved on Jan. 23, 2005.
Search Report for corresponding European Application No. 04774776.1 dated Dec. 28, 2009.
Office Action for corresponding U.S. Appl. No. 10/960,485 dated Feb. 22, 2010.
Office Action dated Jan. 29, 2010 by the Chinese Patent Office for counterpart Chinese application No. 200480030092.2.

\* cited by examiner

FIG. 3

Page Composition Segment Syntax

```
page_composition_segment () {
        segment_type
        segment_length
        page_time_out
        page_version_number
        page_state
        CLUT_id
        number_of_object_entries
        if (i=0; i<number_of_object_entries; i++) {
                object_id
                is_object_cropping
                object_horizontal_address
                object_vertical_address
                if (is_object_cropping) {
                        object_horizontal_cropping
                        object_vertical_cropping
                        object_cropping_width
                        object_cropping_height
                }
        }
}
```

FIG. 4

CLUT Definition Segment Syntax

```
CLUT_definition_segment () {
        segment_type
        segment_length
        CLUT_id
        for (color_index=0; color_index <256; color_index++){
                CLUT_entry_id
                Y-value
                Cr-value
                Cb-value
                T-value
                }
        }
}
```

Object Data Segment Syntax

```
Object_data_segment ( ) {
    segment_type
    segment_length
    object_type
    if (object_type = = text)
        text_object_data ( )
    else {
        object_data ( )
    }
}
```

FIG. 5

```
text_object_data( ) {
    object_id
    text_object_number
    for (j=0; j<text_object_number; j++) {
        text_property fields
        font_property fields
        text_length
        for (i=0; i<text_length; i++) {
            character_code
        }
    }
}
```

FIG. 6

| Text Property | |
|---|---|
| Property | Contents |
| Text-align | left, right, center, justify |
| Text-decoration | overline, underline, line-through, blink, none |
| Text-indent | size |
| Text-transform | capitalize, uppercase, lowercase, none |
| Letter-spacing | - |
| White-space | nowrap, normal |
| Word-spacing | size |
| Text-justify | auto, distribute-all, inter-cluster, inter-indeograph, inter-word, newspaper |

FIG. 7

| Font Property | |
|---|---|
| Property | Contents |
| Font | font-style, font-variant, font-weight, font-size, line-height, font-family |
| Font-family | serif, sans-serif, cursive, fantasy, monospace |
| Font-size | xx-small, x-small, medium, large, x-large, xx-large, small, medium |
| Font-style | italic, oblique, normal |
| Font-variant | small-caps, normal |
| Font-weight | normal, bold, lighter |

Object Data Segment Syntax

```
Object_data_segment ( ) {
    segment_type
    segment_length
    object_type
    if (object_type = = text)
            text_object_data ( )
    else {
            object_data ( )
    }
}
```

FIG. 8

```
object_data ( ) {
    object_id
    object_width
    object_height
    do{ run_length_code
    } while (run_length_code ! = '0 x0000)
}
```

FIG. 9

End of Display set Segment Syntax

```
end_of_display_set_segment () {
    segment_type
    reserved
    segment_length
}
```

FIG. 13

Page Composition Segment Syntax

```
page_composition_segment () {
        segment_type
        segment_length
        page_time_out
        page_version_number
        page_state
        CLUT_id
        number_of_object_entries
        if (i=0; i<number_of_object_entries; i++) {
                object_id
                object_type
                text_property_fields
                font_property_fields
                is_object_cropping
                object_horizontal_address
                object_vertical_address
                if (is_object_cropping) {
                        object_horizontal_cropping
                        object_vertical_cropping
                        object_cropping_width
                        object_cropping_height
                }
        }
}
```

FIG. 14

Text-Object Data Segment_Syntax

```
Object_data_segment ( ) {
    segment_type
    segment_length
    text_object_data( ) {
        object_id
        text_object_number
        for (j=0; j<text_object_number; j++) {
            text_property fields
            font_property fields
            text_length
            for (i=0; i<text_length; i++) {
                character_code
            }
        }
    }
}
```

FIG. 15

BMP-Object Data Segment_Syntax

```
Object_data_segment ( ) {
    segment_type
    segment_length
    bmp_object_data( ) {
        object_id
        object_width
        object_height
        do{ run_length_code
        } while (run_length_code ! = '0 x0000)
    }
}
```

RECORDING MEDIUM HAVING A DATA STRUCTURE FOR MANAGING REPRODUCTION OF TEXT SUBTITLE DATA RECORDED THEREON AND RECORDING AND REPRODUCING METHODS AND APPARATUSES

FOREIGN PRIORITY DATA

The subject application claims priority under 35 U.S.C. 119 on Korean Application No. 10-2003-051252 filed Jul. 25, 2003; the entire contents of which are hereby incorporated by reference.

BACKGROUND OF THE INVENTION

1. Field of the Invention

The present invention relates to a high-density recording medium such as a Blu-ray Disc-ROM (BD-ROM) and associated methods and apparatuses of recording and reproducing.

2. Description of the Related Art

Optical disks capable of storing large amounts of high-quality digital video/audio data such as DVDs (digital versatile disks) and DVD recording/reproducing apparatuses are now commercially available on the market.

Subtitle data such as caption or logo data to be superimposed on main video data of a DVD is recorded thereon as graphic data. An optical disk reproducing apparatus reproduces the subtitle graphic data and main video data of the DVD and displays the main video data and subtitle data together on the screen of an external display apparatus connected to the optical disk reproducing apparatus.

A user of such an optical disk reproducing apparatus, therefore, can view the main video data of a DVD overlaid with related subtitle data (e.g., caption or logo images) using a display apparatus connected to the optical disk reproducing apparatus.

In the mean time, the standardization of new high-density optical disks having higher storage capacity than a DVD has been progressing rapidly. The Blu-ray Disk ROM (BD-ROM) is an example of such new optical disks. An effective method for managing and reproducing subtitle data and graphic image data of the BD-ROM is not yet available.

SUMMARY OF THE INVENTION

A recording medium according to the present invention includes a data structure for managing reproduction of text subtitle data.

In one embodiment, the recording medium stores at least one text subtitle information segment. The text subtitle information segment is represented by a single PES packet of transport packets. The text subtitle information segment includes an identifier identifying the text subtitle information segment as a text subtitle information segment and includes style information for text subtitle data. For example, the style information may indicate at least one of font size, font style and font set for text subtitle data.

In one example embodiment, the text subtitle information segment also includes the text subtitle data. For example, the text subtitle data may be character code data.

In another exemplary embodiment, the recording medium stores at least one text subtitle information segment. Here, the text subtitle information segment includes an identifier identifying the text subtitle information segment as a text subtitle information segment, includes character code data as text subtitle data and includes style information for the text subtitle data.

In a further exemplary embodiment, the recording medium stores at least one text subtitle information segment represented by a single PES packet of transport packets. The text subtitle information segment includes an identifier identifying the text subtitle information segment as a text subtitle information segment and includes text property information for text subtitle data. For example, the text property information may include text alignment information.

In a still further example embodiment, the recording medium stores at least one text subtitle information segment where the text subtitle information segment includes an identifier identifying the text subtitle information segment as a text subtitle information segment, includes text property information for text subtitle data, and includes style information for text subtitle data.

The present invention further provides apparatuses and methods for recording and reproducing the data structure according to the present invention.

BRIEF DESCRIPTION OF THE DRAWINGS

The accompanying drawings, which are included to provide a further understanding of the invention, illustrate the exemplary embodiments of the invention, and together with the description, serve to explain the principles of the present invention.

In the drawings:

FIG. 3 illustrates an example embodiment of the data structure for a page composition segment recorded on a high-density recording medium in accordance with the present invention;

FIG. 4 illustrates an example embodiment of the data structure for a color definition segment recorded on a high-density recording medium in accordance with the present invention;

FIGS. 5-8 illustrate example embodiments of the data structure for an object data segment recorded on a high-density recording medium in accordance with the present invention;

FIG. 9 illustrates an example embodiment of the data structure for an end of display set segment recorded on a high-density recording medium in accordance with the present invention;

FIG. 13 illustrates another exemplary embodiment of the page composition segment syntax in accordance with the present invention; and FIGS. 14-15 illustrate other exemplary embodiments of the object data segment syntax in accordance with the present invention.

DETAILED DESCRIPTION OF EXEMPLARY EMBODIMENTS

In order that the invention may be fully understood, exemplary embodiments thereof will now be described with reference to the accompanying drawings.

Figure 1:
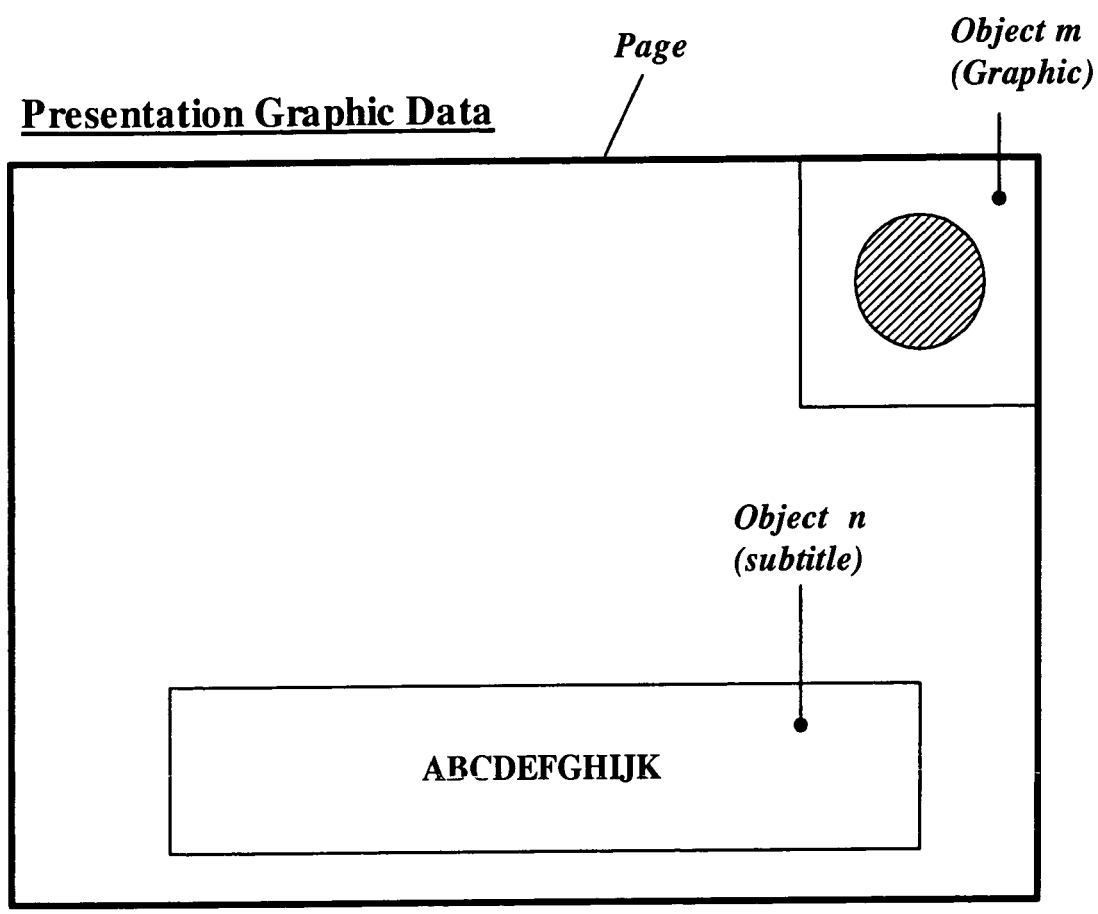
FIG. 1 illustrates an example of a plurality of objects displayed in a page in accordance with the present invention.

According to the present invention, a plurality of objects of presentation graphic data may be included in one page. For example, up to two objects may be displayed in one page as shown in FIG. 1. An object of presentation graphic data recorded on a BD-ROM disk may be recorded as text subtitle data, BMP (bit map) subtitle data, graphic image data, etc. Each object defines a region of presentation graphic data.

Figure 2:
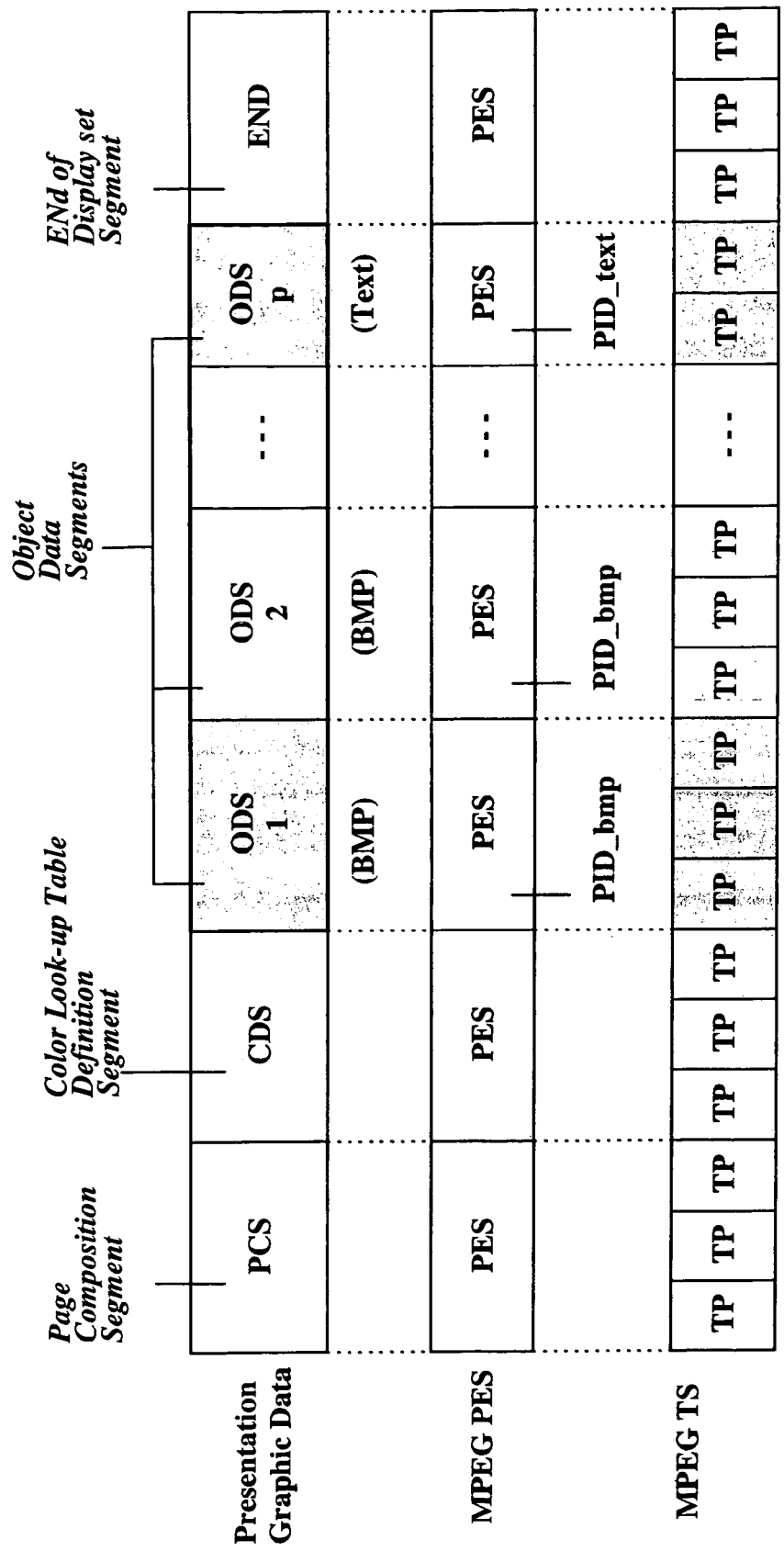
FIG. 2 illustrates presentation graphic data recorded on a high-density optical disk in accordance with the present invention.

Text subtitle data, BMP subtitle data, or graphic image data corresponding to each of the objects is recorded as an object data segment (ODS). At least one object data segment (ODS) may be managed along with one page composition segment (PCS), one color lookup table definition segment (CDS), and one end of display set segment (END) in a hierarchical way as shown in FIG. 2. Each of the above-mentioned segments will be described in detail below.

Each segment in the hierarchical structure is first organized into an MPEG packetized elementary stream (PES) packet and again organized into MPEG transport packets (TPs) before being recorded on a BD-ROM. Namely, each segment (e.g., PCS, CDS, ODS, etc.) is represented by one PES packet. A unique packet ID corresponding to the data type of the object data segment (ODS) is written into the corresponding PES packet. For example, if the object data segment is BMP subtitle data, a unique packet ID, PID_bmp, is written into the corresponding PES packet. Likewise, if the object data segment is text subtitle data, a unique packet ID, PID_text, is written into the corresponding PES packet. The optical disk apparatus for reproducing the BD-ROM, therefore, identifies the data type of each PES packet by examining the packet ID written in the PES packet. The presentation graphic data and main audio/video streams are multiplexed into a single transport stream and stored as a single file.

FIG. 3 illustrates an example embodiment of the data structure for a page composition segment recorded on a high-density recording medium in accordance with the present invention. As shown, the page composition segment (PCS) includes information regarding a segment type, a segment length, a page time-out, a page version number and a page state. The segment type is information for indicating that the segment is a page composition segment (PCS). The segment length indicates the length of the segment. The page time-out is information indicative of when to remove buffering data of the corresponding page from a buffer in a reproducing apparatus. The page version number indicates the version of this PCS. The page state indicates the state of the PCS (e.g., only updating the CDSs linked to the ODSs).

The page composition segment (PCS) also includes a color lookup table ID (CLUT_id), and an indicator of the number of object entries. The CLUT ID indicates the identifier of a CLUT and CDSs having the same CLUT ID are linked to the PCS. For each object entry (i.e., each region of presentation graphic data), the PCS also includes an object ID, an object cropping flag (is_object_cropping), and object horizontal/vertical addresses. The object ID indicates the identifier of an object and links each ODS having that object ID (discussed in detail below) to the PCS. In this manner, ODSs and CDSs may be linked together by the CLUT ID and object ID given in the PCS. The object horizontal/vertical addresses indicate the position of the object on the presentation page (e.g., such as shown in FIG. 1).

If the object cropping flag (is_object_cropping) is set to '1', the object cropping flag information may include object horizontal/vertical cropping data and object cropping width/height data. The object horizontal/vertical cropping data and the object cropping width/length data are recorded for partially displaying an object image. Specifically, the object horizontal/vertical cropping information specify the position of a cropping rectangle (the cropping area) having the dimensions provided by the object cropping width/length. Only that much of the object lying within the cropping rectangle will be displayed.

FIG. 4 illustrates an example embodiment of the data structure for a color lookup table definition segment recorded on a high-density recording medium in accordance with the present invention. As shown in FIG. 4, the color lookup table definition segment (CDS) includes a segment type, a segment length, and a color lookup table ID (CLUT_id). The segment type identifies the segment as a CDS, and the segment length indicates the length of the CDS. The CLUT ID information indicates a family of CLUTs to which the CDS belongs. As will be described in detail below, the CDS provides a single color definition. The family of CLUTs provides a color palette from which to select color definitions.

The color lookup table definition segment may further include information regarding color lookup table entry ID, a brightness value (Y-value), a red chrominance value (Cr-value), a blue chrominance value (Cb-value), and a transparency value (T-value). Accordingly, when linked to an object by a PCS, these values control color attributes of the displayed object such as luminance or brightness, chrominance (Cr and Cb) and transparency. The CLUT entry ID identifies the entry of this CDS in the family of CLUTs (identified by the CLUT ID) to which this CDS belongs.

FIG. 5 illustrates an example embodiment of the data structure for an object data segment recorded on a high-density recording medium in accordance with the present invention. As shown, the object data segment (ODS) includes a segment type, a segment length, and an object type. The segment type indicates the type of the segment as an ODS. The segment length provides the length of the ODS. The object type identifies whether the object data segment is a text subtitle segment, BMP subtitle segment, BMP graphic segment, etc. Namely, the object type identifies the type of data represented by the object data segment.

If the object type indicates that the object data segment is a text subtitle segment, the text object data includes an object ID and a text object number. The object ID identifies the object with which the text subtitle segment is associated. The text object number indicates the number of text objects in this text subtitle segment. For each text object, the text object data includes text property fields, font property fields, and a text length indicator. The text and font property fields will be described below with respect to FIGS. 6 and 7. The text length indicator indicates the length of the text forming this text object of the text subtitle, and a character code is supplied to indicate each character forming the text object.

As shown in FIG. 6, the text property fields include text style information such as text-alignment (e.g., left, right, center, justify, etc.), text-decoration (e.g., overline, underline, line-through, blink, none, etc.), text-indent (e.g., size of the indent), text-transform (e.g., capitalize, uppercase, lowercase, none, etc.), letter-spacing, white-space, word-spacing, and text-justify.

As shown in FIG. 7, the font property fields include font style information such as font, font-family, font-size, font-variant, and font-weight.

If the object type in the ODS were to indicate that the object data segment is BMP subtitle data, the BMP object data includes an object ID, an object width, an object height, run-length code, etc. as shown in FIG. 8. The object ID identifies the object with which the BMP subtitle segment is associated. The object width indicates the width of the object, and the object height indicates the height of the object. The run-length code provides the bit map data in run-length coded format.

FIG. 9 illustrates an example embodiment of the data structure for an end of display set segment recorded on a high-density recording medium in accordance with the present invention. As shown, the end of display set segment (END) includes a segment type, a reserved portion and a segment length. The segment type indicates the segment is an end of display set segment. The reserved portion is reserved for future use, and the segment length indicates the length of the segment.

Figure 10:
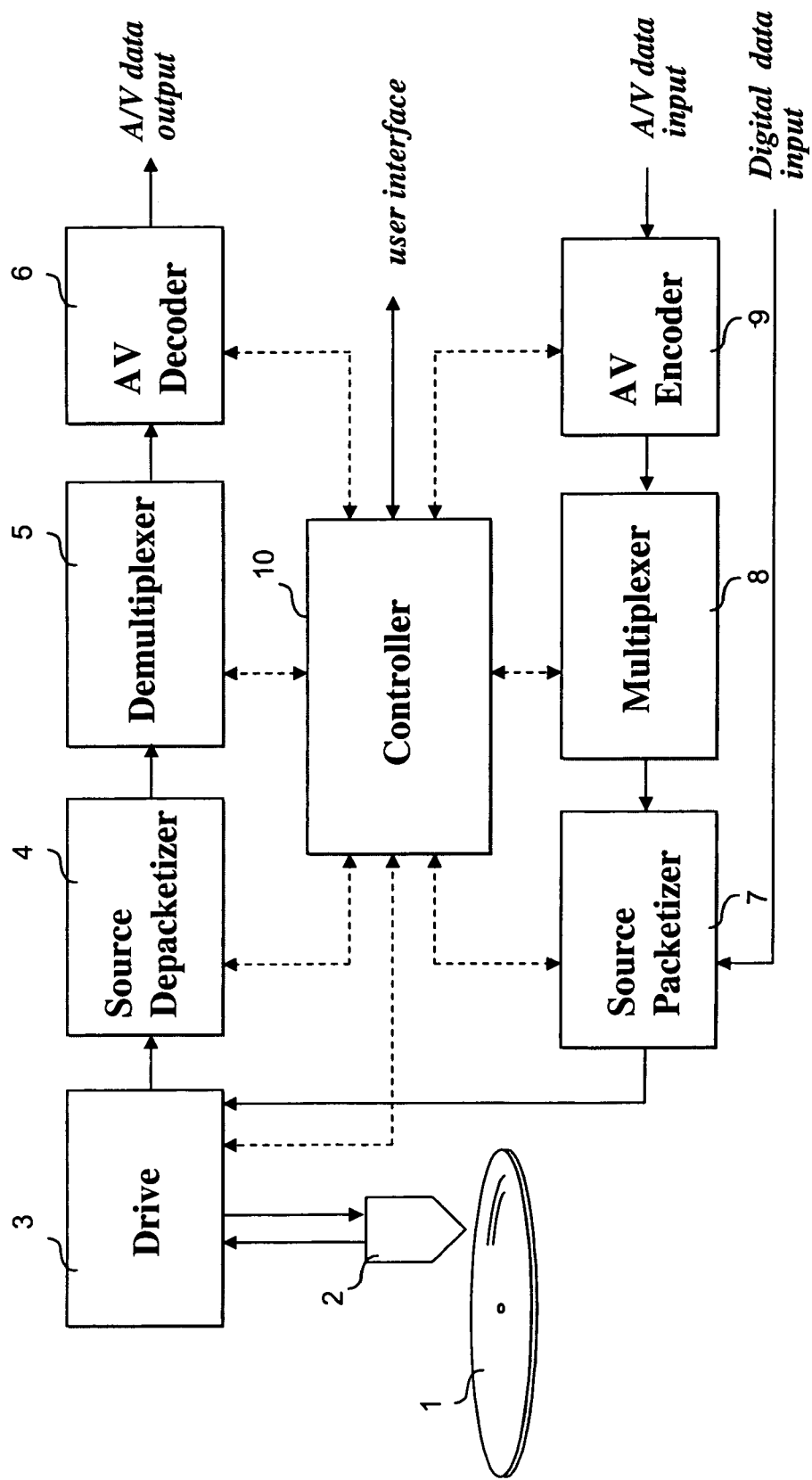
FIG. 10 illustrates a schematic diagram of an embodiment of an optical disk reproducing apparatus of the present invention.

FIG. 10 illustrates a schematic diagram of an embodiment of an optical disk recording and reproducing apparatus according to the present invention. As shown, an AV encoder 9 receives and encodes data (e.g., text subtitle data, etc.). The AV encoder 9 outputs the encoded data along with coding information and stream attribute information. A multiplexer 8 multiplexes the encoded data based on the coding information and stream attribute information to create, for example, an MPEG-2 transport stream. A source packetizer 7 packetizes the transport packets from the multiplexer 8 into source packets in accordance with the audio/video format of the optical disk. As shown in FIG. 10, the operations of the AV encoder 9, the multiplexer 8 and the source packetizer 7 are controlled by a controller 10. The controller 10 receives user input on the recording operation, and provides control information to AV encoder 9, multiplexer 8 and the source packetizer 7. For example, the controller 10 instructs the AV encoder 9 on the type of encoding to perform, instructs the multiplexer 8 on the transport stream to create, and instructs the source packetizer 7 on the source packet format. The controller 10 further controls a drive 3 to record the output from the source packetizer 7 on the optical disk.

For example, based on information received via the user interface (e.g., instruction set saved on disk, provided over an intranet or internet by a computer system, etc.) the controller 10 controls the drive 3 to record one or more of the data structures of FIGS. 2-9 and 13-15 (described below) on the optical disk.

During reproduction, the controller 10 controls the drive 3 to reproduce this data structure. Based on the information contained therein, as well as user input received over the user interface (e.g., control buttons on the recording and reproducing apparatus or a remote associated with the apparatus), the controller 10 controls the drive 3 to reproduce the data from the optical disk.

The reproduced source packets are received by a source depacketizer 4 and converted into a data stream (e.g., an MPEG-2 transport packet stream). A demultiplexer 5 demultiplexes the data stream into encoded data. An AV decoder 6 decodes the encoded data to produce the original data that was feed to the AV encoder 9. During reproduction, the controller 10 controls the operation of the source depacketizer 4, demultiplexer 5 and AV decoder 6. The controller 10 receives user input on the reproducing operation, and provides control information to AV decoder 6, demultiplexer 5 and the source packetizer 4. For example, the controller 10 instructs the AV decoder 9 on the type of decoding to perform, instructs the demultiplexer 5 on the transport stream to demultiplex, and instructs the source depacketizer 4 on the source packet format.

While FIG. 10 has been described as a recording and reproducing apparatus, it will be understood that only a recording or only a reproducing apparatus may be provided using those portions of FIG. 10 providing the recording or reproducing function.

If a user of the optical disk apparatus requests reproduction of text subtitle data among presentation graphic data recorded on the BD-ROM 1, the controller 10 identifies the text subtitle data by checking the packet ID of the PES packet corresponding to the object data segment (ODS) of the text subtitle data as described with reference to FIG. 2 or by checking the object type contained in the object data segment (ODS) of the text subtitle data as described with reference to FIG. 5.

Figure 11:
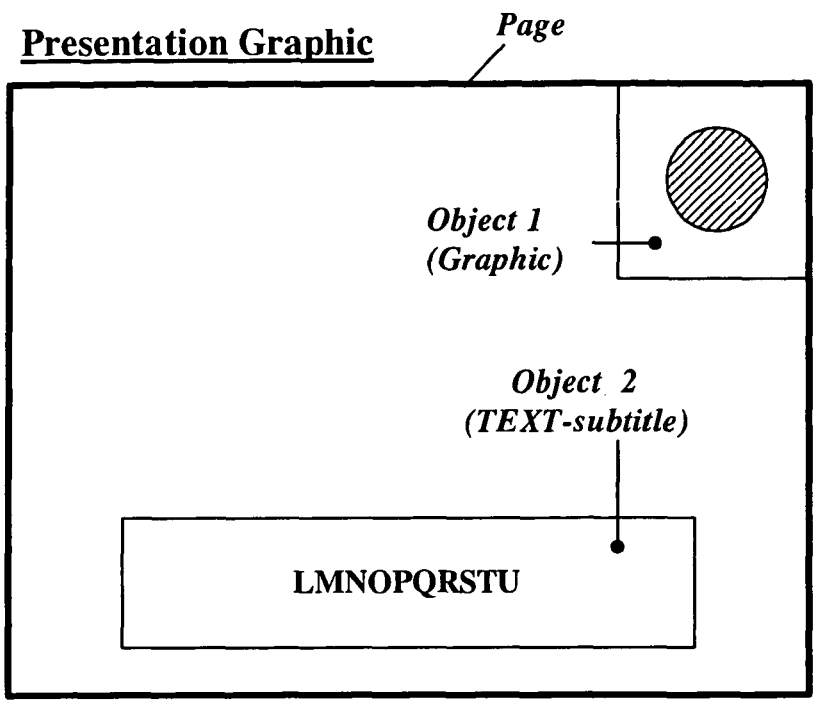
FIGS. 11 and 12 illustrate objects of text subtitle data displayed in various styles in accordance with the present invention.
Figure 12:
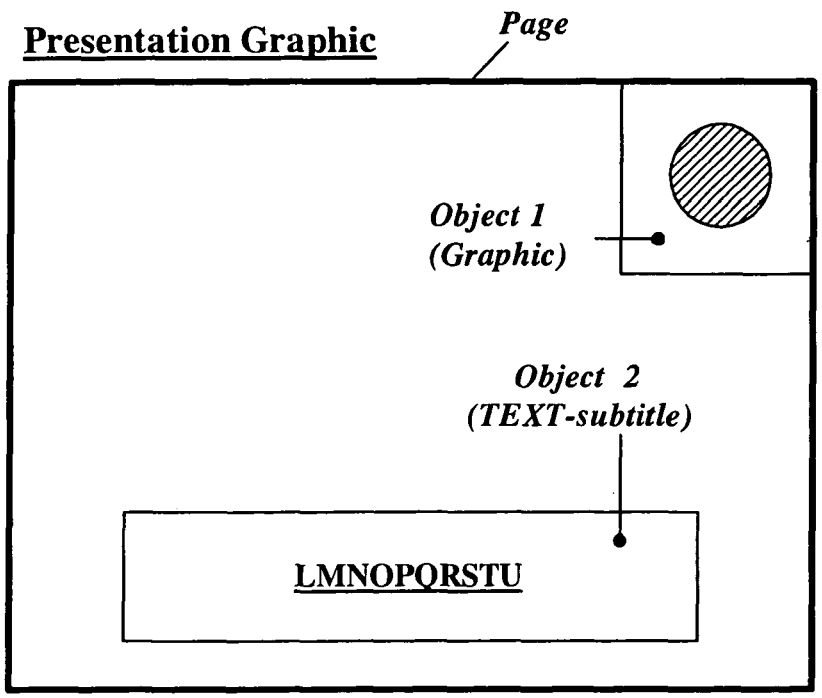

The controller 10 then presents the text subtitle data in various styles according to the text style information included in the text property fields and font style information included in the font property fields, both contained in the object data segment (ODS) of the text subtitle data. As shown in FIG. 11, two objects (Object 1 of a graphic image and Object 2 of text subtitle data) may be simultaneously presented in one page. The object of the text subtitle data (Object 2) may be presented in various text and font styles as shown in FIGS. 11 and 12.

In another embodiment of the present invention, the object type, text property fields, and font property fields, which were included in the object data segment (ODS), are included in the page composition segment (PCS) as shown in FIG. 13. In this case, the controller 10 of the optical disk apparatus presents the object of the text subtitle data in various styles according to the object type information, text property fields, and font property fields included in the page composition segment.

In still another embodiment of the present invention, the text style and font style information is stored in the object data segment (ODS) of the text subtitle data, but the text property fields and font property fields are not classified explicitly. Instead, the text style and font style information is recorded sequentially after a predetermined identification code (e.g., Escape code=0xffff). In this case, the controller 10 of the optical disk apparatus presents the object of the text subtitle data in various text and font styles according to the text style and font style information that follows the predetermined identification code.

In yet another embodiment of the present invention, the text object data segment (Text-ODS) is recorded in parallel with the page composition segment (PCS), color lookup table definition segment (CDS), and a different type of object data segment (ODS) (e.g., BMP object data segment or graphic image object data segment). In this embodiment, the segment type information included in the text object data segment (Text-ODS) has a unique value indicating that the segment is a text object data segment. The other fields in the text-ODS are as described with respect to FIG. 5.

The other type of object data segment (ODS) (e.g., BMP object data segment (BMP-ODS)) is shown in FIG. 15. This ODS includes segment type information having a unique value for indicating that the segment is, for example, a BMP object data segment (BMP-ODS). The other fields in the ODS are as described with respect to FIG. 8.

The controller 10 of the optical disk apparatus is capable of selectively reproducing text object data segments by referring to the segment type information and displaying the text objects in various text and font styles according to the text property fields and font property fields included therein.

The present invention provides a recording medium having a data structure for managing the reproduction of subtitle data, and provides methods and apparatuses for recording the data structure on the recording medium.

While the invention has been disclosed with respect to a limited number of embodiments, those skilled in the art, having the benefit of this disclosure, will appreciate numerous modifications and variations there from. For example, while described with respect to a Blu-ray ROM optical disk in several instances, the present invention is not limited to this standard of optical disk or to optical disks. It is intended that all such modifications and variations fall within the spirit and scope of the invention.

What is claimed is:

1. An optical disk storing an executable data structure for managing reproduction of text data by a reproducing device, comprising:

an area storing at least one main audio-visual (AV) data and at least one subtitle information segment, each subtitle information segment being represented by each PES packet of transport packets and having a one-to-one correspondence with the PES packet, the PES packet including a packet identifier for identifying a type of the packet, wherein the at least one subtitle information segment includes a segment identifier identifying the subtitle information segment as one of text data and graphic data;

wherein a first subtitle information segment of the at least one subtitle information segment identified as the text data includes a palette identifier identifying palette information for controlling color attributes of the text data, wherein a second subtitle information segment of the at least one subtitle information segment identified as the text data includes at most two text subtitle regions, and each text subtitle region is linked to at least one first style information defined in the first subtitle information segment using an identifier, wherein the second subtitle information segment of the at least one subtitle information segment identified as the text data includes second style information for managing reproduction of the text data by the reproducing device, and wherein a third subtitle information segment of the at least one subtitle information segment identified as the graphic data is multiplexed with the at least one main AV data into a file.

2. The optical disk of claim 1, wherein second subtitle information segment identified as the text data includes style information for each region.

3. The optical disk of claim 1, wherein the style information indicates at least one of font size, font style and font set for text data.

4. The optical disk of claim 1, wherein the text data is character code data.

5. The optical disk of claim 1, wherein the second subtitle information segment identified as the text data includes an indicator of a number of text subtitle regions, and for each region, the subtitle information segment includes the text data and associated style information.

6. A method of recording a data structure for managing reproduction of text data on a recording medium, the method comprising:

recording, by a reproducing device, at least one main audio-visual (AV) data and at least one subtitle information segment on the recording medium, each subtitle information segment being represented by a PES packet of transport packets and having a one-to-one correspondence with the PES packet, the PES packet including a packet identifier for identifying a type of the packet, wherein the at least one subtitle information segment includes a segment identifier identifying the subtitle information segment as one of text data and graphic data;

wherein a first subtitle information segment of the at least one subtitle information segment identified as the text data includes a palette identifier identifying palette information for controlling color attributes of the text data, wherein a second subtitle information segment of the at least one subtitle information segment identified as the text data includes at most two text subtitle regions, and each text subtitle region is linked to at least one first style information defined in the first subtitle information segment using an identifier, wherein the second subtitle information segment of the at least one subtitle information segment identified as the text data includes second style information for managing reproduction of the text data by the reproducing device, and wherein a third subtitle information segment of the at lest one subtitle information segment identified as the graphic data is multiplexed with the at least one main AV data into a file.

7. The method of claim 6, wherein the second subtitle information segment identified as the text data includes more than one text subtitle region, and the subtitle information segment includes style information for each region.

8. The method of claim 6, wherein the style information indicates at least one of font size, font style and font set for the text data.

9. A method of reproducing a data structure for managing reproduction of subtitle data from a recording medium, comprising:

reproducing, by a reproducing device, at least one main audio-visual (AV) data and at least one subtitle information segment from the recording medium, each subtitle information segment being represented by a PES packet of transport packets and having a one-to-one correspondence with the PES packet, the PES packet including a packet identifier for identifying a type of the packet, wherein the at least one subtitle information segment includes a segment identifier identifying the subtitle information segment as one of text data and graphic data;

wherein a first subtitle information segment of the at least one subtitle information segment identified as the text data includes a palette identifier identifying palette information for controlling color attributes of the text data, wherein a second subtitle information segment of the at least one subtitle information segment identified as the text data includes at most two text subtitle regions, and each text subtitle region is linked to at least one first style information defined in the first subtitle information segment using an identifier, wherein the second subtitle information segment of the at least one subtitle information segment identified as the text data includes second style information for managing reproduction of the text data by the reproducing device, and wherein a third subtitle information segment of the at least one subtitle information segment identified as the graphic data is multiplexed with the at least one main AV data into a file.

10. The method of claim 9, wherein the second subtitle information segment identified as the text data includes more than one text subtitle region, and the subtitle information segment identified as the text data includes style information for each region.

11. The method of claim 9, wherein the style information indicates at least one of font size, font style and font set for the text data.

12. An apparatus for recording a data structure for managing reproduction of text data on a recording medium, comprising:
   a pickup configured to record data on the recording medium; and
   a controller configured to control the pickup to record at least one main audio-visual (AV) data and at least one subtitle information segment on the recording medium, each subtitle information segment being represented by each PES packet of transport packets and having a one-to-one correspondence with the PES packet, the PES packet including a packet identifier for identifying a type of the packet, wherein the at least one subtitle information segment includes a segment identifier identifying the subtitle information segment as one of text data and graphic data,
   wherein a first subtitle information segment of the at least one subtitle information segment identified as the text data includes a palette identifier identifying palette information for controlling color attributes of the text data, and
   wherein a second subtitle information segment of the at least one subtitle information segment identified as the text data includes at most two text subtitle regions, and each text subtitle region is linked to at least one first style information defined in the first subtitle information segment using identifier,
   wherein the second subtitle information segment of the at least one subtitle information segment identified as the text data includes second style information for managing reproduction of the text data by the reproducing device, and
   wherein a third subtitle information segment of the at least one subtitle information segment identified as the graphic data is multiplexed with the at least one main AV data into a file.

13. The apparatus of claim 12, wherein the controller is configured to control the pickup to record the second subtitle information segment identified as the text data to include more than one text subtitle region, and the subtitle information segment identified as the text data includes style information for each region.

14. The apparatus of claim 12, wherein the controller is configured to control the pickup to record the style information indicating at least one of font size, font style and font set for the text data.

15. An apparatus for reproducing a data structure for managing reproduction of text data from a recording medium, comprising:
   a pickup configured to reproduce data recorded on the recording medium; and
   a controller configured to control the pickup to reproduce at least one main audio-visual (AV) data and at least one subtitle information segment from the recording medium, each subtitle information segment being represented by each PES packet of transport packets and having a one-to-one correspondence with the PES packet, the PES packet including a packet identifier for identifying a type of the packet, wherein the at least one subtitle information segment includes a segment identifier identifying the subtitle information segment as one of text data and graphic data,
   wherein a first subtitle information segment of the at least one subtitle information segment identified as the text data includes a palette identifier identifying palette information for controlling color attributes of the text data,
   wherein a second subtitle information segment of the at least one subtitle information segment identified as the text data includes at most two text subtitle regions, and each text subtitle region is linked to at least one first style information defined in the first subtitle information segment using an identifier,
   wherein the second subtitle information segment of the at least one subtitle information segment identified as the text data includes second style information for managing reproduction of the text data by the reproducing device, and
   wherein a third subtitle information segment of the at last one subtitle information segment identified as the graphic data is multiplexed with the at least one main AV data into a file.

16. The apparatus of claim 15, wherein the controller is configured to control the pickup to reproduce the second subtitle information segment identified as the text data to include more than one subtitle region, and the subtitle information segment identified as the text data includes style information for each region.

17. The apparatus of claim 15, wherein the controller is configured to control the pickup to reproduce the style information indicating at least one of font size, font style and font set for the text data.

* * * * *